United States Patent
Colley

(10) Patent No.: US 9,791,928 B2
(45) Date of Patent: *Oct. 17, 2017

(54) APPARATUS, METHOD, COMPUTER PROGRAM AND USER INTERFACE

(75) Inventor: Ashley Colley, Oulu (FI)

(73) Assignee: Nokia Technologies Oy, Espoo (FI)

( * ) Notice: Subject to any disclaimer, the term of this patent is extended or adjusted under 35 U.S.C. 154(b) by 335 days.

This patent is subject to a terminal disclaimer.

(21) Appl. No.: 12/767,349

(22) Filed: Apr. 26, 2010

(65) Prior Publication Data

US 2011/0265000 A1    Oct. 27, 2011

(51) Int. Cl.
G06F 3/01      (2006.01)
G06F 3/023     (2006.01)
G06F 3/0482    (2013.01)

(52) U.S. Cl.
CPC ............ G06F 3/016 (2013.01); G06F 3/0238 (2013.01); G06F 3/0482 (2013.01)

(58) Field of Classification Search
None
See application file for complete search history.

(56) References Cited

U.S. PATENT DOCUMENTS

| | | | |
|---|---|---|---|
| 7,196,688 B2 | 3/2007 | Schena | |
| 7,567,681 B2 | 7/2009 | Pelrine et al. | |
| 7,952,566 B2 | 5/2011 | Poupyrev et al. | |
| 8,378,798 B2 | 2/2013 | Bells et al. | |
| 8,407,623 B2 | 3/2013 | Kerr et al. | |
| 8,749,495 B2 | 6/2014 | Grant et al. | |
| 8,954,887 B1 | 2/2015 | Tseng et al. | |
| 9,387,395 B2* | 7/2016 | Rom | A63F 13/06 |
| 2002/0054060 A1 | 5/2002 | Schena | |
| 2004/0017376 A1* | 1/2004 | Tagliabue et al. | 345/581 |
| 2004/0164971 A1 | 8/2004 | Hayward et al. | |
| 2004/0169674 A1 | 9/2004 | Linjama | |
| 2004/0216059 A1* | 10/2004 | Vong | G06F 3/1431 715/840 |
| 2005/0024341 A1* | 2/2005 | Gillespie et al. | 345/173 |
| 2005/0030292 A1 | 2/2005 | Diederiks | |

(Continued)

FOREIGN PATENT DOCUMENTS

CN      1678978 A    10/2005
EP     1 575 069 B1    9/2005
(Continued)

OTHER PUBLICATIONS

International Search Report and Written Opinion for Application No. PCT/IB2011/051695 dated Aug. 15, 2011.
(Continued)

Primary Examiner — Tuan S Nguyen
(74) Attorney, Agent, or Firm — Alston & Bird LLP

(57) ABSTRACT

An apparatus, method, computer program and apparatus provide a user input device which is intended to be easier for a user to use. A tactile feedback which differentiates a user selectable part from other user selectable parts is provided. The tactile feedback may only be provided when a specific function is available and the tactile feedback may be indicative of a characteristic of the function. For example, the tactile feedback may indicate that the function cannot be reversed and so the user knows to take extra care and avoid unintentionally actuating the selectable part.

20 Claims, 5 Drawing Sheets

(56) References Cited

U.S. PATENT DOCUMENTS

| | | | |
|---|---|---|---|
| 2005/0057528 A1 | 3/2005 | Kleen | |
| 2005/0088417 A1* | 4/2005 | Mulligan | G06F 3/04886 345/173 |
| 2005/0156904 A1 | 7/2005 | Katayose | |
| 2005/0168449 A1 | 8/2005 | Katayose | |
| 2006/0066569 A1 | 3/2006 | Eid et al. | |
| 2006/0103634 A1 | 5/2006 | Kim et al. | |
| 2007/0106457 A1 | 5/2007 | Rosenberg | |
| 2007/0140667 A1* | 6/2007 | Uchimura | H04N 21/23614 386/248 |
| 2007/0152974 A1 | 7/2007 | Kim et al. | |
| 2007/0152982 A1 | 7/2007 | Kim et al. | |
| 2007/0236449 A1 | 10/2007 | Lacroix et al. | |
| 2007/0236450 A1 | 10/2007 | Colgate et al. | |
| 2007/0247420 A1* | 10/2007 | Strohband | H01H 13/84 345/156 |
| 2007/0285402 A1 | 12/2007 | Lim et al. | |
| 2008/0010593 A1 | 1/2008 | Uusitalo et al. | |
| 2008/0024459 A1 | 1/2008 | Poupyrev et al. | |
| 2008/0143693 A1 | 6/2008 | Schena | |
| 2008/0303796 A1 | 12/2008 | Fyke | |
| 2009/0002140 A1 | 1/2009 | Higa | |
| 2009/0007758 A1 | 1/2009 | Schlosser | |
| 2009/0015560 A1* | 1/2009 | Robinson et al. | 345/168 |
| 2009/0033617 A1 | 2/2009 | Lindberg et al. | |
| 2009/0075694 A1 | 3/2009 | Kim et al. | |
| 2009/0128376 A1 | 5/2009 | Caine et al. | |
| 2009/0128503 A1 | 5/2009 | Grant et al. | |
| 2009/0189873 A1 | 7/2009 | Peterson et al. | |
| 2009/0195861 A1 | 8/2009 | Jendbro et al. | |
| 2009/0250267 A1* | 10/2009 | Heubel | G06F 3/041 178/18.03 |
| 2009/0303175 A1 | 12/2009 | Koivunen | |
| 2009/0315832 A1 | 12/2009 | Gray | |
| 2009/0322498 A1 | 12/2009 | Yun et al. | |
| 2010/0013653 A1 | 1/2010 | Birnbaum et al. | |
| 2010/0053078 A1 | 3/2010 | Kim et al. | |
| 2010/0060475 A1 | 3/2010 | Choi | |
| 2010/0079410 A1 | 4/2010 | Minton | |
| 2010/0088654 A1* | 4/2010 | Henhoeffer | G06F 3/04883 715/863 |
| 2010/0097323 A1* | 4/2010 | Edwards et al. | 345/173 |
| 2010/0141606 A1 | 6/2010 | Bae et al. | |
| 2010/0238114 A1* | 9/2010 | Vartanian et al. | 345/168 |

FOREIGN PATENT DOCUMENTS

| | | |
|---|---|---|
| EP | 2 073 508 A1 | 6/2009 |
| GB | 2 463 012 A | 3/2010 |
| TW | 200638238 A | 11/2006 |
| TW | 200937256 A | 9/2009 |
| WO | WO 03/050754 A1 | 6/2003 |
| WO | WO 2008/037275 A1 | 4/2008 |
| WO | WO 2009/097866 A1 | 8/2009 |
| WO | WO 2010/070604 A1 | 6/2010 |

OTHER PUBLICATIONS

International Search Report and Written Opinion for Application No. PCT/IB2011/051727 dated Aug. 17, 2011.
International Search Report and Written Opinion for Application No. PCT/IB2011/051667 dated Aug. 9, 2011.
Office Action for U.S. Appl. No. 12/767,367 dated Nov. 21, 2012
Office Action for U.S. Appl. No. 12/767,367 dated May 21, 2013
Advisory Action for U.S. Appl. No. 12/767,367 dated Aug. 5, 2013
Office Action for U.S. Appl. No. 12/767,367 dated Sep. 12, 2013
Office Action for. U.S. Appl. No. 12/767,367 dated Dec. 30, 2013.
Office Action for U.S. Appl. No. 12/767,367 dated Aug. 12, 2014.
Office Action for U.S. Appl. No. 12/767,344 dated Jul. 2, 2012.
Office Action for U.S. Appl. No. 12/767,344 dated Jan. 11, 2013.
Office Action for U.S. Appl. No. 12/767,344 dated Jun. 19, 2013.
Office Action for U.S. Appl. No. 12/767,344 dated Oct. 3, 2013.
Office Action for U.S. Appl. No. 12/767,344 dated Feb. 10, 2014.
Office Action for U.S. Appl. No. 12/767,344 dated Jun. 3, 2014.
Office Action for U.S. Appl. No. 12/767,344 dated Sep. 19, 2014.
Office Action from Canadian Application No. 2,797,340 dated Jun. 4, 2014.
Office Action for Russian Application No. 2012149583/08(079491) dated Aug. 26, 2014.
Office Action and Search Report for Taiwanese Application No. 100114281 dated Jul. 1, 2015.
Office Action for Chinese Application No. 201180021017.X dated Jul. 27, 2015.
Office Action for Taiwanese Application No. 100114280 dated Jun. 30, 2015.
Office Action for Chinese Application No. 201180021017.X dated Dec. 17, 2014.
Office Action for U.S. Appl. No. 12/767,367 dated Dec. 31, 2014.
Office Action for U.S. Appl. No. 12/767,344 dated Feb. 6, 2015.
Office Action for Chinese Application No. 201180021017X dated Dec. 29, 2015.
Examiner's Answer for U.S. Appl. No. 12/767,367 dated Oct. 29, 2015.
Examiner's Answer for U.S. Appl. No. 12/767,344 dated Feb. 5, 2016.
Extended European Search Report for European Patent Application No. 11774505.9 dated Nov. 21, 2016, 6 pages.
Extended European Search Report for European Patent Application No. 11774507.5 dated Nov. 21, 2016, 8 pages.
Extended European Search Report for European Patent Application No. 11774510.9 dated Nov. 21, 2016, 9 pages.
Office Action for Chinese Application No. 201180021017.X dated Jun. 2, 2016.
Notice of Allowance for U.S. Appl. No. 12/767,344 dated Mar. 16, 2017, 13 pages.
Notice of Allowance for U.S. Appl. No. 12/767,367 dated Apr. 11, 2017, 16 pages.
SemFeel: A User Interface with Semantic Tactile Feedback for Mobile Touch-Screen Devices [online] [retrieved May 12, 2017]. Retrieved from the Internet: <URL: http://iis-lab.org/paper/UIST2009.pdf>. 10 pages.
Notice of Allowance for U.S. Appl. No. 12/767,344 dated May 26, 2017, 2 pages.

* cited by examiner

APPARATUS, METHOD, COMPUTER PROGRAM AND USER INTERFACE

FIELD OF THE INVENTION

Embodiments of the present invention relate to an apparatus, method, computer program and user interface. In particular, they relate to an apparatus, method, computer program and user interface which is simple and convenient for a user to use.

BACKGROUND TO THE INVENTION

Apparatus which enable a user to make inputs via a user input device are well known. The apparatus may be configured to perform a plurality of different functions or store a plurality of different pieces of information. It is useful to make the apparatus easy for a user to use to reduce the number of inadvertent actuations while still enabling easy and convenient access to the functions of the apparatus.

BRIEF DESCRIPTION OF VARIOUS EMBODIMENTS OF THE INVENTION

According to various, but not necessarily all, embodiments of the invention there is provided an apparatus comprising: a user input device; at least one processor; and at least one memory including computer program code; wherein the at least one memory and the computer program code are configured to, with the at least one processor, enable the apparatus to: provide a user selectable part of the user input device; configure the apparatus in either a first state or a second state wherein, in the first state the user selectable part is associated with a first function, having a first characteristic, so that the first function is performed in response to actuation of the user selectable part and in the second state the user selectable part is not associated with the first function so that the first function is not performed in response to the actuation of the user selectable part; and configure the apparatus to control a tactile quality of the user selectable part with respect to the rest of the user input device so that the user selectable part is provided with a first tactile quality when the apparatus is in the first state and a second tactile quality when the apparatus is in the second state wherein the tactile quality is indicative of the first characteristic of the first function.

In some embodiments of the invention the tactile quality may be the height of the user selectable part with respect to the rest of the user input device so that the user selectable part may be provided at a first relative height when the apparatus is in the first state and a second relative height when the apparatus is in the second state wherein the relative height is indicative of the first characteristic of the first function.

In some embodiments of the invention the first relative height may be higher than the rest of the user input device. In other embodiments of the invention the first relative height may be lower than the rest of the user input device.

In some embodiments of the invention the tactile quality may be the texture of the user selectable part.

In some embodiments of the invention the first characteristic may be that the function is available. In other embodiments of the invention the first characteristic may be that the function comprises committing to a transaction. Committing to a transaction may comprise performing an action which cannot easily be reversed.

In some embodiments of the invention the first characteristic may be the probability that the function will be selected.

In some embodiments of the invention the tactile quality of the user selectable part may be proportional to the probability that the function will be selected.

In some embodiments of the invention the first characteristic associated with the first function may be dependent upon the context of the apparatus.

In some embodiments of the invention a plurality of user selectable parts may be provided. Each of the user selectable parts may be provided with different tactile qualities depending on the characteristics of the functions associated with the user selectable parts.

In some embodiments of the invention the change in the tactile quality of a part of the user input device may be provided by a change in the topology of an electroactive polymer.

According to various, but not necessarily all, embodiments of the invention there is also provided a method comprising: providing a user selectable part of a user input device of an apparatus; configuring the apparatus in either a first state or a second state wherein, in the first state the user selectable part is associated with a first function, having a first characteristic, so that the first function is performed in response to actuation of the user selectable part and in the second state the user selectable part is not associated with the first function so that the first function is not performed in response to the actuation of the user selectable part; and controlling a tactile quality of the user selectable part with respect to the rest of the user input device so that the user selectable part is provided with a first tactile quality when the apparatus is in the first state and a second tactile quality when the apparatus is in the second state wherein the tactile quality is indicative of the first characteristic of the first function.

In some embodiments of the invention the tactile quality may be the height of the user selectable part with respect to the rest of the user input device so that the user selectable part may be provided at a first relative height when the apparatus is in the first state and a second relative height when the apparatus is in the second state wherein the relative height is indicative of the first characteristic of the first function.

In some embodiments of the invention the first relative height may be higher than the rest of the user input device. In other embodiments of the invention the first relative height may be lower than the rest of the user input device.

In some embodiments of the invention the tactile quality may be the texture of the user selectable part.

In some embodiments of the invention the first characteristic may be that the function is available. In other embodiments of the invention the first characteristic may be the probability that the function will be selected. The tactile quality of the user selectable part may be proportional to the probability that the function will be selected.

In some embodiments of the invention the first characteristic may be that the function comprises committing to a transaction. Committing to a transaction may comprise performing an action which cannot easily be reversed.

In some embodiments of the invention the first characteristic associated with the first function may be dependent upon the context of the apparatus.

In some embodiments of the invention the method may also comprise providing a plurality of user selectable parts.

Each of the user selectable parts may be provided with different tactile qualities depending on the characteristics of the functions associated with the user selectable parts.

In some embodiments of the invention the change in the tactile quality of a part of the user input device may be provided by a change in the topology of an electroactive polymer.

According to various, but not necessarily all, embodiments of the invention there is also provided a computer program comprising computer program instructions that, when executed by at least one processor, enable an apparatus at least to perform: providing a user selectable part of a user input device of the apparatus; configuring the apparatus in either a first state or a second state wherein, in the first state the user selectable part is associated with a first function, having a first characteristic, so that the first function is performed in response to actuation of the user selectable part and in the second state the user selectable part is not associated with the first function so that the first function is not performed in response to the actuation of the user selectable part; and controlling the tactile quality of the user selectable part with respect to the rest of the user input device so that the user selectable part is provided with a first tactile quality when the apparatus is in the first state and a second tactile quality when the apparatus is in the second state wherein the tactile quality is indicative of the first characteristic of the first function.

In some embodiments of the invention there may also be provided a computer program comprising program instructions for causing a computer to perform the method as described above.

In some embodiments of the invention there may also be provided a physical entity embodying the computer program as described above.

In some embodiments of the invention there may also be provided an electromagnetic carrier signal carrying the computer program as described above.

According to various, but not necessarily all, embodiments of the invention there is also provided a user interface comprising: a user input device wherein the user input device comprises a user selectable part wherein, in a first state the user selectable part is associated with a first function, having a first characteristic, so that the first function is performed in response to actuation of the user selectable part and in a second state the user selectable part is not associated with the first function so that the first function is not performed in response to the actuation of the user selectable part; and the tactile quality of the user selectable part with respect to the rest of the user input device may be controlled so that the user selectable part is provided with a first tactile quality when the apparatus is in the first state and a second tactile quality when the apparatus is in the second state wherein the relative tactile quality is indicative of the first characteristic of the first function.

In some embodiments of the invention the first characteristic associated with the first function may be dependent upon the context of the apparatus.

In some embodiments of the invention the tactile quality may be the height of the user selectable part with respect to the rest of the user input device so that the user selectable part may be provided at a first relative height when the apparatus is in the first state and a second relative height when the apparatus is in the second state wherein the relative height is indicative of the first characteristic of the first function.

In some embodiments of the invention the first relative height may be higher than the rest of the user input device.

In other embodiments of the invention the first relative height may be lower than the rest of the user input device.

According to various, but not necessarily all, embodiments of the invention there is also provided an apparatus comprising: means for providing a user selectable part of a user input device of an apparatus; means for configuring the apparatus in either a first state or a second state wherein, in the first state the user selectable part is associated with a first function, having a first characteristic, so that the first function is performed in response to actuation of the user selectable part and in the second state the user selectable part is not associated with the first function so that the first function is not performed in response to the actuation of the user selectable part; and means for controlling a tactile quality of the user selectable part with respect to the rest of the user input device so that the user selectable part is provided with a first tactile quality when the apparatus is in the first state and a second tactile quality when the apparatus is in the second state wherein the tactile quality is indicative of the first characteristic of the first function.

The apparatus may be for wireless communication.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
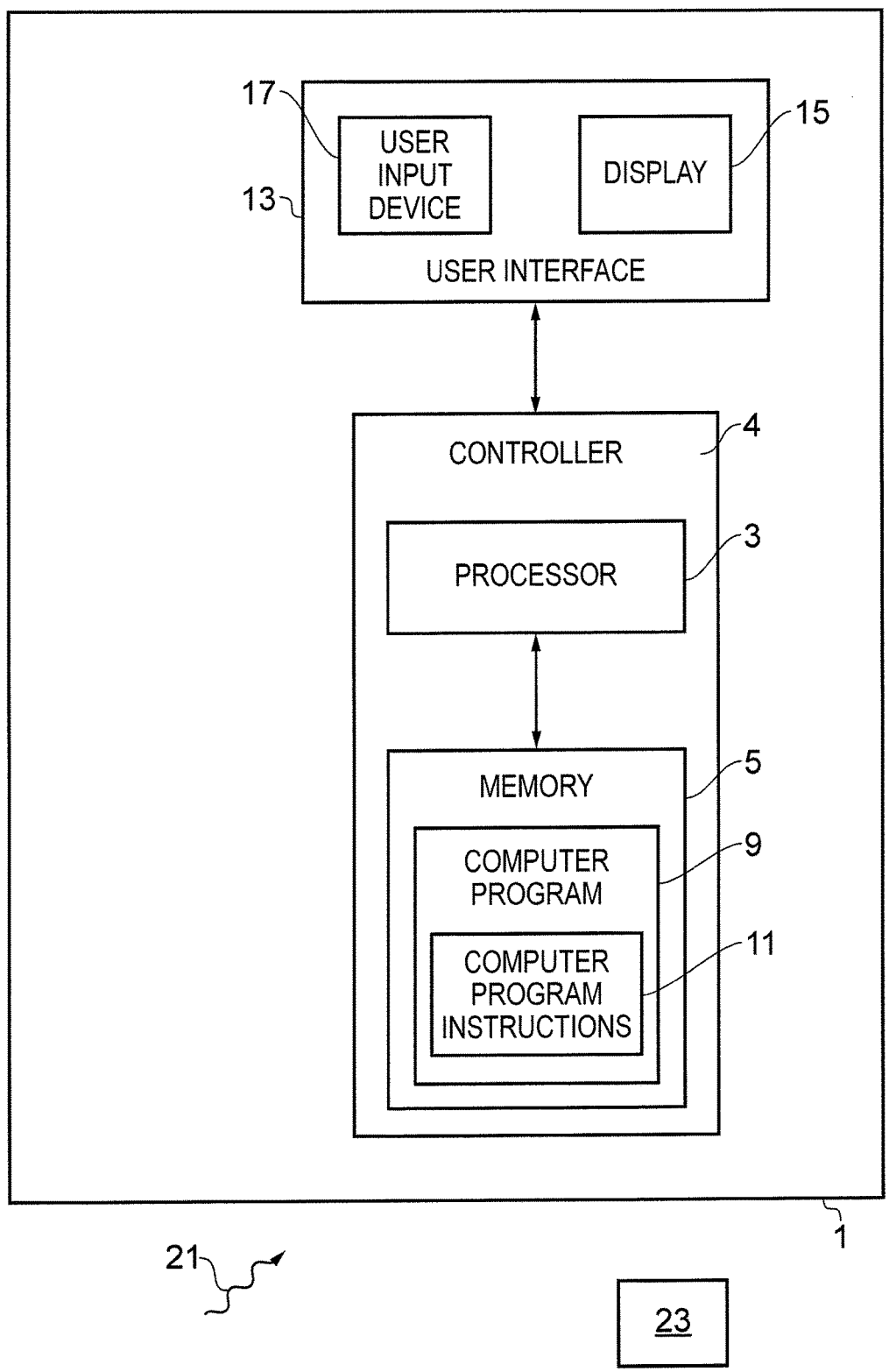
FIG. 1 schematically illustrates an apparatus according to an exemplary embodiment of the invention.

The Figures illustrate an apparatus 1, method, computer program and apparatus wherein the apparatus 1 comprises: a user input device 17; at least one processor 3; and at least one memory 5 including computer program code 9; wherein the at least one memory 5 and the computer program code 9 are configured to, with the at least one processor 3, enable the apparatus 1 to: provide a user selectable part 51 of the user input device 1; configure the apparatus 1 in either a first state or a second state wherein, in the first state the user selectable part 51 is associated with a first function, having a first characteristic, so that the first function is performed in response to actuation of the user selectable part 51 and in the second state the user selectable part 51 is not associated with the first function so that the first function is not performed in response to the actuation of the user selectable part 51; and configure the apparatus 1 to control the tactile quality of the user selectable part 51 with respect to the rest of the user input device 17 so that the user selectable part 51 is provided with a first tactile quality when the apparatus is in the first state and a second tactile quality when the apparatus 1 is in the second state wherein the tactile quality is indicative of the first characteristic of the first function.

FIG. 1 schematically illustrates an apparatus 1 according to an exemplary embodiment of the invention. The apparatus 1 may be an electronic apparatus. The apparatus 1 may be, for example, a mobile cellular telephone, a personal computer, a camera, a gaming device, a personal digital assistant, a personal music player or any other apparatus which enables a user to make user inputs to control the apparatus 1. The apparatus 1 may be a handheld apparatus 1 which can be carried in a user's hand, handbag or jacket pocket for example.

Only features referred to in the following description are illustrated in FIG. 1. However, it should be appreciated that the apparatus 1 may comprise additional features that are not illustrated. For example, in embodiments of the invention where the apparatus 1 is a mobile cellular telephone, the apparatus 1 may also comprise a transmitter and receiver configured to enable wireless communication.

The apparatus 1 illustrated in FIG. 1 comprises: a user interface 13 and a controller 4. In the illustrated embodiment the controller 4 comprises at least one processor 3 and at least one memory 5 and the user interface 13 comprises a display 15 and a user input device 17.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet. The controller 4 may also be configured to enable a user to commit to a transaction. Committing to a transaction may comprise performing an action that cannot easily be reversed. Such an action may be, for example, authorising a payment, sending a message such as an email, deleting content from the one or more memories 5 or transferring content to a removable medium, for example, burning a CD.

The controller 4 may also be configured to enable the apparatus 1 to provide a user selectable part 51 of the user input device 17; configure the apparatus 1 in either a first state or a second state wherein, in the first state the user selectable part 51 is associated with a first function, having a first characteristic, so that the first function is performed in response to actuation of the user selectable part 51 and in the second state the user selectable part 51 is not associated with the first function so that the first function is not performed in response to the actuation of the user selectable part 51; and configure the apparatus 1 to control the tactile quality of the user selectable part 51 with respect to the rest of the user input device so that the user selectable part 51 is provided with a first tactile quality when the apparatus 1 is in the first state and a second tactile quality when the apparatus 1 is in the second state wherein the tactile quality is indicative of the first characteristic of the first function.

The at least one processor 3 is configured to receive input commands from the user interface 13 and also to provide output commands to the user interface 13. The at least one processor 3 is also configured to write to and read from the at least one memory 5. The outputs of the user interface 13 are provided as inputs to the controller 4.

In the exemplary embodiment illustrated in FIG. 1 the user interface 13 comprises a user input device 17 and a display 15.

The user input device 17 may comprise any means which enables a user of the apparatus 1 to input information which may be used to control the apparatus 1. The user input device 17 may also enable a user to input information which may be stored in the one or more memories 5 of the apparatus 1. The user input device 17 may comprise a touch sensitive display, a keypad or a combination of a number of different types of user input devices.

In embodiments of the invention the user input device 17 may be configured to provide one or more user selectable parts 51 to a user. Each of the user selectable parts 51 may be associated with different functions of the apparatus 1 so that the function is performed in response to actuation of the user selectable part. The function associated with the user selectable part 51 may be dependent upon the mode of operation and/or the context of the apparatus 1.

In embodiments of the invention the user selectable parts 51 may be provided with different tactile qualities. For example, in some embodiments of the invention the user selectable parts 51 may be provided at different heights. The height of the user selectable part 51 relative to the rest of the user input device 17 may be dependent upon a characteristic of the function associated with the user selectable part. The relative height of the user selectable parts 51 may change as the mode of operation and/or context of the apparatus 1 changes. The relative height of a user selectable part 51 may be higher than the rest of the user input device 17 or lower than the rest of the user input device 17. The difference in the relative height of the user selectable part 51 is such that it may be felt by the user via the sense of touch. The difference in the relative heights may be of the order of several mm. An example of a user input device 17 configured to provide user selectable parts 51 at different relative heights is illustrated in more detail in FIG. 2.

In other embodiments of the invention the tactile quality of the user selectable part 51 may be the texture. The user input device 17 may be configured so that some of the user selectable parts 51 have a rougher texture than the rest of the user input device 17. In other embodiments of the invention the user selectable parts 51 may have a smoother texture. The user can feel the difference in texture using their sense of touch.

Figure 6A:
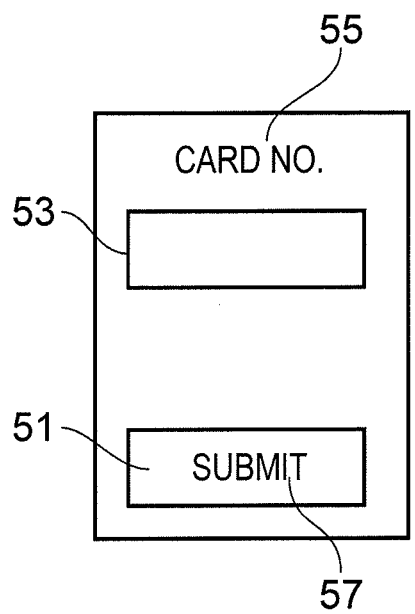
FIGS. 6A to 6B illustrate another exemplary embodiment of the invention in use.
Figure 6B:
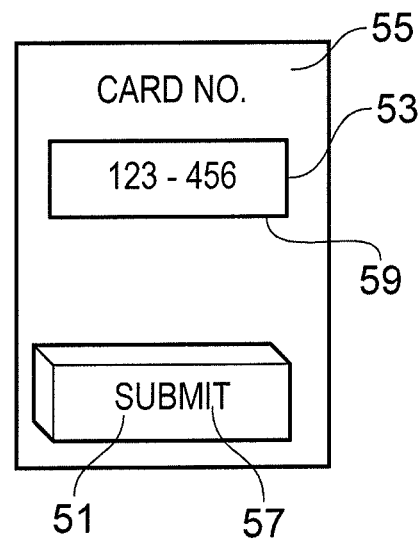
Figure 7:
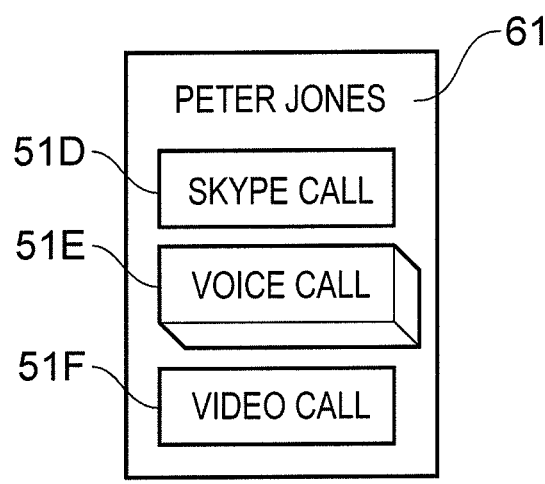
FIG. 7 illustrates a further exemplary embodiment of the invention in use.

The display 15 may comprise any means which enables information to be displayed to a user of the apparatus 1. The information may correspond to information which has been input by the user via the user input device 17, information which is stored in the one or more memories 5 or information which has been received by apparatus 1. Graphical user interfaces 59, 61 as illustrated in FIGS. 6A, 6B and 7 may also be displayed on the display 15.

In some embodiments of the invention the user input device 17 and the display 15 may be combined to provide a touch sensitive display which both enables information to be displayed to a user and enables a user to make user inputs.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIG. 4. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for providing a user selectable part 51 of a user input device 17 of the apparatus 1; means for configuring the apparatus 1 in either a first state or a second state wherein, in the first state the user selectable part 51 is associated with a first function, having a first characteristic, so that the first function is performed in response to actuation of the user selectable part 51 and in the second state the user selectable part 51 is not associated with the first function so that the first function is not performed in response to the actuation of the user selectable part 51; and means for controlling the tactile quality of the user selectable part 51 with respect to the rest of the user input device so that the user selectable part 51 is provided with a first tactile quality when the apparatus 1 is in the first state and a second tactile quality when the apparatus 1 is in the second state wherein the tactile quality is indicative of the first characteristic of the first function.

The computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code 9. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/ cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
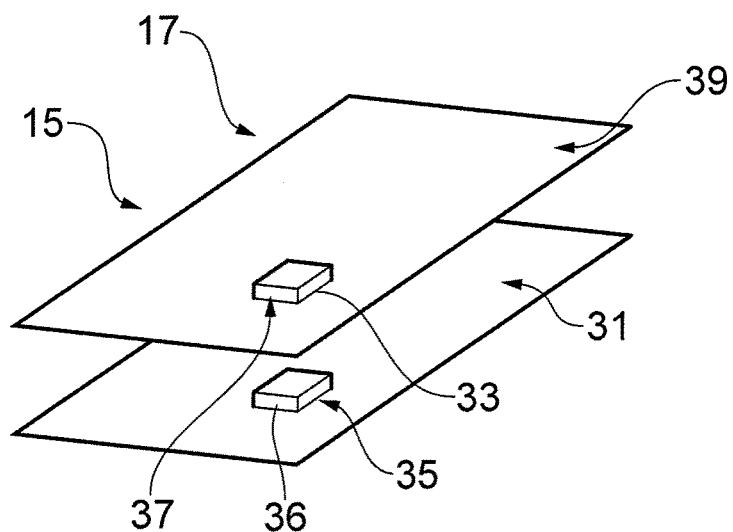
FIG. 2 illustrates a touch sensitive display configured to provide a tactile indication according to an exemplary embodiment of the invention.

FIG. 2 illustrates a user input device 17 according to an exemplary embodiment of the invention. The user input device 17 is configured to provide one or more user selectable parts 51 having different tactile qualities. In this exemplary embodiment at least one of the user selectable parts 51 is provided at a different relative height to the rest of the user input device 17. In this particular embodiment the user input device 17 comprises a touch sensitive display 15.

The touch sensitive display 15 comprises a flexible surface layer 39 overlaying an electroactive polymer (EAP) layer 31. The flexible surface layer 39 may comprise part of the outer surface of the apparatus 1. The flexible surface layer 39 may be actuated by a user. The actuation may comprise a user touching the flexible surface layer 39 with a device such as a finger or a stylus.

The electroactive polymer (EAP) layer 31 is provided underneath the flexible surface layer 39. The electroactive polymer may comprise any material which changes shape when a voltage is applied to it. The EAP layer 31 may be configured to provide localized changes in topology. That is, the EAP layer 31 may be configured so that a first portion of the EAP layer 31 may be raised or lowered with respect to the other portions of the EAP layer 31. The EAP layer 31 may be provided as a grid of EAP elements. The voltage across the EAP layer 31 may be controlled by the controller 4 thereby enabling the controller 4 to control the topology of the EAP layer 31. The controller 4 may control when the topology of the EAP layer 31 is changed.

The EAP layer 31 is positioned underneath the flexible surface layer 39 so that any change in the topology of the EAP layer 31 causes a corresponding change in the topology of the flexible surface layer 39.

In the embodiment illustrated in FIG. 2 a voltage has been applied to a first portion 35 of the EAP layer 31. This has caused the first portion 35 to become raised with respect to the rest of the EAP layer 31 so that the first portion 35 comprises a projection 36. The projection 36 in the first portion 35 of the EAP layer 31 also deforms the flexible surface layer 39 so that a corresponding projection 37 is provided in a first portion 33 of the flexible surface layer 39 overlaying the first portion 35 of the EAP layer 31. The projection provides the first portion 33 of the touch sensitive display 15 at a different relative height to the rest of the touch sensitive display 15. A user selectable part 51 may be displayed in the first portion 33 so that the user selectable part 51 is provided at a higher level than the rest of the user input device 17.

In the illustrated embodiment the EAP layer 31 provides a user selectable part 51 at a higher level than the rest of the user input device 17. It is to be appreciated that in other embodiments of the invention the user selectable part 51 could be provided at a lower level by controlling the EAP layer 31 to provide an indentation rather than a projection or to provide a change in the surface texture.

Figure 3:
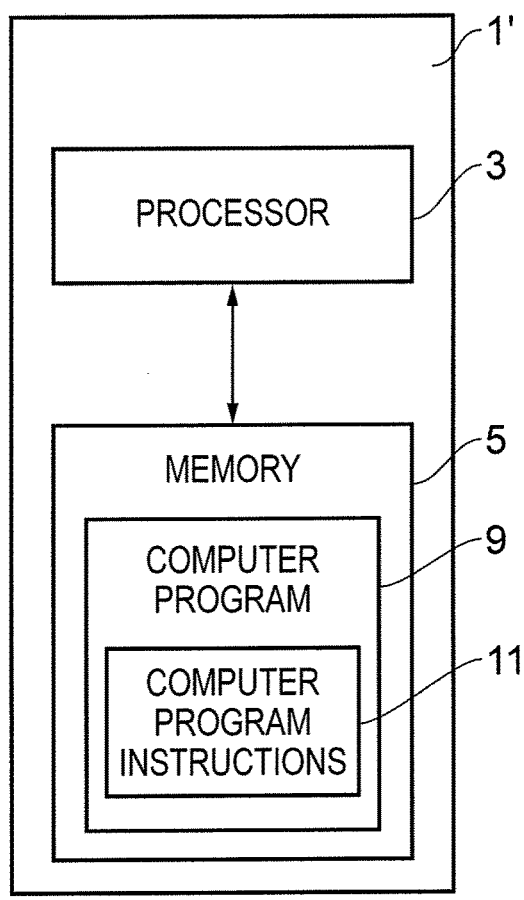
FIG. 3 illustrates a touch sensitive display configured to provide a tactile indication according to a second exemplary embodiment of the invention.

FIG. 3 illustrates an apparatus 1' according to another embodiment of the invention. The apparatus 1' illustrated in FIG. 3 may be a chip or a chip-set. The apparatus 1' comprises at least one processor 3 and at least one memory 5 as described above in relation to FIG. 1.

Figure 4:
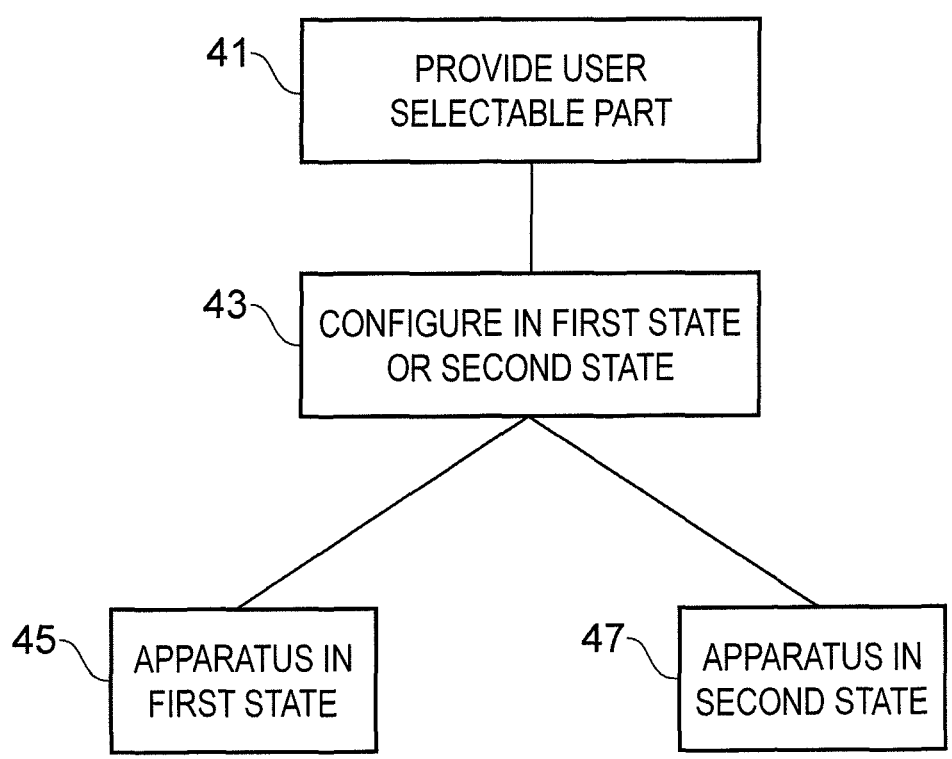
FIG. 4 is a block diagram which schematically illustrates a method according to an exemplary embodiment of the invention.

A method of controlling the apparatus 1, according to embodiments of the invention, is illustrated schematically in FIG. 4.

At block 41 a user selectable part 51 is provided. The user selectable part 51 may comprise any part of a user input device 13 which may be actuated and in response to the actuation provide a control signal to the controller 4. A plurality of user selectable parts 51 may be provided simultaneously. The user selectable parts 51 may comprise portions of a touch sensitive display 15 which may be actuated by a user. In other embodiments of the invention the user selectable parts 51 may comprise a key or a plurality of keys in a key pad.

At block 43 the apparatus 1 is configured either in a first state or a second state. The first and second states may be any states in which the apparatus 1 is operable to perform functions. For example, in embodiments of the invention where the apparatus 1 is a mobile telephone the states may be a state in which the user may make or receive a telephone call or access a communications network such as the internet.

In the first state the user selectable part 51 is associated with a first function so that the first function is performed in response to actuation of the user selectable part 51. In the second state the user selectable part 51 is not associated with the first function so that the first function is not performed in response to actuation of the user selectable part 51. In some embodiments of the invention, when the apparatus 1 is configured in the second state the user selectable part 51 may be associated with a second function, different to the first function, so that the second function is performed in response to actuation of the user selectable part 41. Alternatively, in the second state the user selectable part 51 might not be associated with any function so that no function is performed in response to actuation of the user selectable part 51.

The apparatus 1 may be switched between the first and second states. The apparatus 1 may be switched between the first and second states in response to a user input. For example a user may select a first mode of operation in which the first function is available or a second mode of operation in which the first function is not available by selecting an item from a menu. Alternatively the user may input information which enables a first function to be performed. This may enable the apparatus 1 to switch between the two states as it might not be possible for the first function to be performed without the input information. For example a user may input a telephone number so that a telephone call may be made or they may input information into a field on a webpage which enables a transaction to be authorized.

In some embodiments of the invention the apparatus 1 may be switched between the first and second states without any input from the user of the apparatus 1. For example the apparatus 1 may receive an incoming call or message. In embodiments of the invention where the apparatus 1 is a portable or a handheld apparatus 1 the apparatus 1 may move from an area where access to a communications network is not available to an area where access to a communications network is available. In embodiments of the invention where the apparatus 1 is configured for enabling a message service such as instant messaging the function may be messaging a specific user of the messaging service. This function may only be available when the other user is online or has logged on to the service.

At block 45 the apparatus 1 has been configured in the first state so that the user selectable part is associated with the first function. The controller 4 determines that the apparatus 1 is in the first state and also that the user selectable part is associated with the first function. For example the controller 4 may determine that a function which comprises committing to a transaction is available. The controller 4 controls the user interface to control a tactile quality of the user selectable part 51 with respect to the rest of the user input device 17 so that the user selectable part 51 is provided with a different tactile quality relative to the rest of the user input device.

The tactile quality of the user input part 51 is indicative of a characteristic of the first function. For example, in some embodiments of the invention the function associated with the user input part 51 may comprise committing to a transaction which cannot easily be reversed, for example the function may comprise authorising a payment, sending a message such as an email, deleting content from the one or more memories 5 or transferring content to a removable medium. In such embodiments it is important that the user does not inadvertently actuate the user input part 51 and so the user input part 51 may be provided at a lower height or with a rougher texture than the rest of the user input device 17. This not only makes the user input part 51 feel different to the rest of the user input device 17 but it may also make the user input part 51 more difficult to actuate.

In other embodiments of the invention it may be advantageous to make the user input part 51 easier to actuate. In such embodiments the user input part 51 may be provided at a higher level than the rest of the user input device 17. For example, the characteristic which determines the relative height of the user input part 51 may be the probability that the function will be selected. If the user input part is associated with a function which has a high probability of being selected it may be provided at a higher level than the rest of the user input device 17. In some embodiments of the invention, if the user input part 51 is associated with a function which has a low probability of being selected it may be provided at a lower level than the rest of the user input device 17. The probability that a function will be selected may be determined based on the previous use of the apparatus or previous actions of the user.

In other embodiments of the invention the characteristic which determines the tactile quality of the user input part 51 may be that the function has become available. As mentioned above, the function may have become available because of information which has been input by the user or because access to a communications network has become available. The change in tactile quality of the user input part 51 when the apparatus 1 is configured in the first state may provide an indication to the user that the function has become available.

In embodiments of the invention where the user interface 13 comprises a touch sensitive display 15 with an EAP layer 31, as illustrated in FIG. 2, the relative height of the user input part 51 may be controlled by controlling the local topology of the EAP layer 31. The controller 4 may control the voltage across the EAP layer 31 to change the localized topology of the EAP layer 31 and flexible surface layer 39. The change in the topology may comprise a projection 37 as illustrated in FIG. 2 or an indentation depending upon the characteristic of the function associated with the user input part 51.

At block 47 the apparatus 1 has been configured in the second state so that the user selectable part 51 is not associated with the first function. The controller 4 determines that the apparatus 1 is in the second state and controls the EAP layer 31 so that the user selectable part 51 is provided with a second tactile quality relative to the rest of the user input device 17. The second tactile quality is different to the first tactile quality so that there is a change in the tactile quality of the user selectable part 51 when the apparatus 1 switches between the two states. In embodiments of the invention where the tactile quality is the height of the user selectable part 51 the second height may be the same level or substantially the same level as the rest of the user input device 17.

Figure 5A:
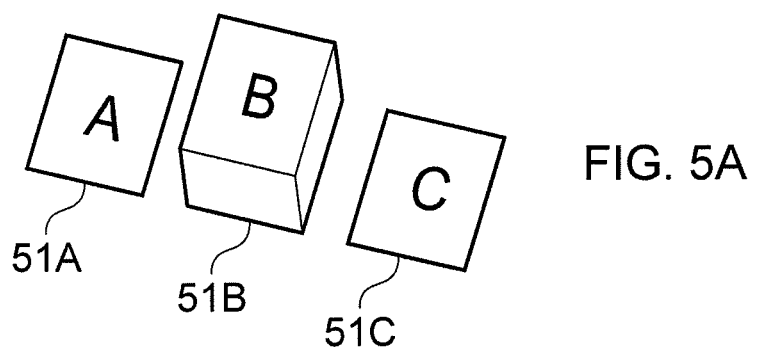
FIGS. 5A to 5B illustrate an exemplary embodiment of the invention in use.
Figure 5B:
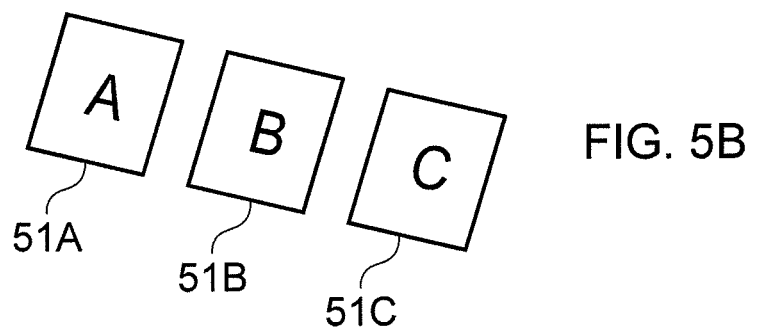

FIGS. 5A and 5B illustrate a plurality of user selectable parts according to embodiments of the invention. The user selectable parts 51A, 51B, 51C may be provided a touch sensitive display 15 with an EAP layer 31 as illustrated in FIG. 2.

FIG. 5A illustrates an embodiment of the invention in a first state. In the embodiment illustrated in FIG. 5A three user selectable parts 51A, 51B, 51C are provided. The user selectable parts 51A, 51B, 51C are three distinct regions on a touch sensitive display 15. One of the user selectable parts 51B is associated with a first function so that the first function is performed in response to the actuation of the user selectable part 51B. The other user selectable parts 51A, 51C are not associated with the first function but may be associated with other, different functions.

The user selectable part 51B is provided at a higher level than the other user selectable parts 51A, 51C. The height of the user selectable part 51B enables a user to distinguish the user selectable part 51B from the other user selectable parts 51A, 51C using their sense of touch. The height of the user selectable part 51B provides an indication of a characteristic of the function associated with the user selectable part 51B.

When the apparatus 1 is switched between the first state and the second state the controller 4 may control the voltage across the EAP layer 31 to change the topology of the EAP layer 31 and the flexible surface layer 39.

FIG. 5B illustrates the embodiment of the invention in a second state. In the embodiment illustrated in FIG. 5B the user selectable part 51B is no longer associated with the first function. The user may have switched the apparatus 1 between the states by making a user input or by moving the apparatus 1 to an area where the first function is no longer available.

As the user selectable part 51B is no longer associated with the first function the user selectable part 51B is no longer provided at the first height. In the illustrated embodiment the user selectable part 51B is now provided at the same height as the other user selectable parts 51A, 51C. The controller 4 controls the voltage across the EAP layer 31 so that the flexible surface layer 39 is substantially flat with no projections or indentations which would be felt by the user.

FIGS. 6A and 6B illustrate a graphical user interface 55 according to another embodiment of the invention. The graphical user interface 55 may be displayed on a touch sensitive display 15 as illustrated in FIG. 2. The graphical user interface 55 enables a user to authorize a payment by submitting payment details including a card number. In the embodiment illustrated in FIGS. 6A and 6B the user switches from the first state to the second state.

In FIG. 6A a user selectable part 51 and a user input field 53 are provided. The user input field 53 enables a user to input information. In this particular embodiment the information comprises payment details including the number of card such as a bank card or credit card.

The user selectable part 51 comprises a label 57 indicating that the user selectable part 51 has to be actuated to submit the payment details and authorize the payment.

However, in FIG. 6A no information has been input in the user input field 53 and so the function of authorizing the payment cannot be performed. Therefore the user selectable part 51 is provided at the same level as the rest of the touch sensitive display 15. The user cannot distinguish between the user input part 51 and the rest of the touch sensitive display 15 by touch.

In FIG. 6B the user has now input information comprising a card number into the user input field 53. As the card number has been input the function of authorizing a payment can now be performed. This has changed the state of the apparatus 1 from a state in which the user selectable part 51 is not associated with a function to a state in which the user selectable part 51 is associated with a function.

The controller has controlled the apparatus 1 to change the height of the user selectable part 51 relative to the rest of the touch sensitive display 15. This enables the user to feel the user selectable part 51 and distinguish between the user selectable part 51 and the rest of the touch sensitive display 15 using their sense of touch. The change in height of the user input part 51 as the apparatus switches between the states provides an indication to the user that the function of authorizing the payment has become available.

In the embodiment illustrated in FIG. 6B the user selectable part 51 is provided at a lower level than the rest of the touch sensitive display 15. This may make the user selectable part 51 more difficult to actuate and so reduces the chances of the user inadvertently actuating the user selectable part 51 and committing to a transaction which cannot easily be reversed. In other embodiments of the invention the user input part 51 may be provided at a higher level.

FIG. 7 illustrates another graphical user interface 61 according to another exemplary embodiment of the invention. This graphical user interface 61 may also be displayed on a touch sensitive display as illustrated in FIG. 2. The graphical user interface 61 enables a user to establish a communication link with a contact. In this particular embodiment the contact is "Peter Jones".

The graphical user interface comprises a plurality of user selectable parts 51D, 51E, 51F. Each of the user selectable parts 51D, 51E, 51F enables a different type of communication link to be established and so each of the user selectable parts 51D, 51E, 51F is associated with a different function. The first user selectable part 51D is associated with the function of making a skype call, the second user selectable part 51E is associated with the function of making a voice call and the third user selectable part 51F is associated with the function of making a video call.

In the embodiment illustrated in FIG. 7 the height of the user selectable part 51D, 51E, 51F is determined by the probability that the user will select the particular function. The probability that a user will select a function may be determined by previous actions of the user.

In FIG. 7 the most commonly selected function is the voice call function. As the voice call function has a higher probability of being selected the user selectable part 51E associated with the voice call function is provided at a higher level than the other user selectable parts 51D, 51F. This makes it easier for the user to determine which of the user selectable parts is associated with the voice call function and also makes it easier for the user to actuate this particular user selectable part.

Embodiments of the invention provide the advantage that they provide a user interface which is simple and convenient for a user to use. By controlling the height of the user selectable parts in dependence upon a characteristic of the function associated with the user selectable part this provides a mechanism which enables a user to easily distinguish between different user selectable parts. It may also provide an indication to a user when a function becomes available. It may also be used to make some user selectable parts more difficult to actuate to reduce the chance of a user inadvertently committing to a function which cannot easily be reversed. It may also be used to make some user selectable parts easier to actuate, for example by making the most commonly used functions more prominent in the user interface.

In some embodiments of the invention the apparatus 1 may be switched between the first and second states by navigating through a menu. The user selectable parts 51 may comprise menu options. The relative height of the user selectable parts may depend upon whether or not there is another menu level below the displayed menu level. For example where the menu structure comprises a plurality of folders, if there are one or more files or sub-folders within a folder the user selectable part 51 may be provided at a first level whereas if there are no files or sub-folders within the folder the user selectable part 51 may be provided at a second different level. This provides the user with a clear indication of whether or not there are any files stored in a folder without having to access the folder. It may also make the folders with the most files easier for the user to access as these folders may be more prominent in the user interface.

The blocks illustrated in FIG. 4 may represent operations in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example in the illustrated embodiments the user input device comprises a touch sensitive display. It is to be appreciated that in other embodiments of the invention the user input device may comprise one or more keys in a key pad and the relative heights of the keys may be changed.

Also in the above described embodiment the localized projections or indentations are provided by an EAP layer. In other embodiments of the invention the localized projections may be provided by any other suitable means such as a mechanical or fluid pumping system or a piezo electric transducer.

The change in the tactile quality of the user selectable part may be used to provide an indication to the user of more than one change of state or context of the apparatus. For example, in the embodiment described above in relation to FIGS. 6A and 6B the tactile quality of the user selectable part changes when information is entered into the user input field. After the user has actuated the user selectable part the user may be provided with another graphical user interface which requires that the user checks that the information has been input correctly. The tactile quality of the user selectable part may change again once the user has confirmed that information is correct.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   at least one processor; and
   at least one memory including computer program code;
   wherein the at least one memory and the computer program code are configured to, with the at least one processor, enable the apparatus to:
   control two or more user input elements comprising a user selectable part of a user input device;
   determine the apparatus is in a first state or a second state based on the user input elements comprising the user selectable part, wherein in the first state the user selectable part is associated with a first function so that the first function is performed in response to actuation of the user selectable part, and wherein in the second state the user selectable part is associated with a second function, different from the first function, so that the second function is performed in response to the actuation of the user selectable part; and
   control a tactile quality of the user selectable part with respect to the rest of the user input elements so that the user selectable part is provided with a first tactile quality when the apparatus is in the first state and a second different tactile quality when the apparatus is in the second state, wherein the tactile qualities are configured so that a user can distinguish between the first tactile quality and the second tactile quality via a sense of touch, wherein the user selectable part is selectable with the first tactile quality to perform the first function in the first state and the user selectable part is selectable with the second tactile quality to perform the second function in the second state such that the user can distinguish between the user selectable part in the first state and the same user selectable part in the second state via a sense of touch.

2. An apparatus as claimed in claim 1 wherein the tactile quality is the height of the user selectable part with respect to the rest of the user input device so that the user selectable part is provided at a first relative height when the apparatus is in the first state and a second relative height when the apparatus is in the second state.

3. An apparatus as claimed in claim 2 wherein the first relative height or the second relative height is higher than the relative height of the rest of the user input elements.

4. An apparatus as claimed in claim 2 wherein the first relative height or the second relative height is lower than the relative height of the rest of the user input device.

5. An apparatus as claimed in claim 1 wherein the tactile quality is the texture of the user selectable part.

6. An apparatus as claimed in claim 1, wherein the two or more user input elements comprise two or more user selectable parts, including the user selectable part, and each of the two or more user selectable parts is provided with a respective tactile quality that is proportional to a probability that the associated function will be selected.

7. An apparatus as claimed in claim 6 wherein the tactile quality provided for each of the two or more user selectable parts is one of projection from a flat surface, level with the flat surface, indentation from the flat surface, a smooth texture, or a rough texture.

8. An apparatus as claimed in claim 1 wherein a plurality of user selectable parts are provided.

9. An apparatus as claimed in claim 8 wherein each of the user selectable parts are provided with different tactile qualities depending on the characteristics of the functions associated with the user selectable parts.

10. An apparatus as claimed in claim 1 wherein the change in the tactile quality of a part of the user input device is provided by a change in the topology of an electroactive polymer.

11. An apparatus as claimed in claim 1 wherein the tactile quality comprises at least one of a projection or a smooth-textured portion to make the user selectable part easier to actuate compared to other user selectable parts of the user input device.

12. An apparatus as claimed in claim 1 wherein the tactile quality comprises at least one of an indentation or a rough-textured portion to make the user selectable part harder to actuate compared to other user selectable parts of the user input device.

13. An apparatus as claimed in claim 1 wherein the at least one memory and the computer program code are further configured to, with the at least one processor, enable the apparatus to:
- receive user input to at least one of the user input elements; and
- switch, in response to the user input, from a first state to a second state or from a second state to a first state.

14. An apparatus as claimed in claim 1 wherein a user input to at least one of the user input elements increases a probability that the user selectable part is selected, and the apparatus is further configured to switch from the second state to the first state in which the first tactile quality makes the user selectable part easier to actuate than the second tactile quality in the second state.

15. An apparatus as claimed in claim 1 wherein the user selectable part is associated with another function in the second state so that the another function is performed in response to actuation of the user selectable part in the second state.

16. A method comprising:
- controlling two or more user input elements comprising a user selectable part of a user input device;
- determining that an apparatus is in either a first state or a second state based on user input elements comprising the user selectable part, wherein in the first state the user selectable part is associated with a first function so that the first function is performed in response to actuation of the user selectable part, and wherein in the second state the user selectable part is associated with a second function, different from the first function, so that the second function is performed in response to the actuation of the user selectable part; and
- controlling a tactile quality of the user selectable part with respect to the rest of the user input device so that the user selectable part is provided with a first tactile quality when the apparatus is in the first state and a second tactile quality when the apparatus is in the second state, wherein the tactile qualities are configured so that a user can distinguish between the first tactile quality and the second tactile quality via a sense of touch, wherein the user selectable part is selectable with the first tactile quality to perform the first function in the first state and the user selectable part is selectable with the second tactile quality to perform the second function in the second state such that the user can distinguish between the user selectable part in the first state and the same user selectable part in the second state via a sense of touch.

17. A method as claimed in claim 16 wherein the tactile quality is the height of the user selectable part with respect to the rest of the user input device so that the user selectable part is provided at a first relative height when the apparatus is in the first state and a second relative height when the apparatus is in the second state.

18. A method as claimed in claim 16 wherein the tactile quality is the texture of the user selectable part.

19. A computer program product comprising at least one non-transitory computer-readable storage medium having computer-executable program code instructions stored therein, the computer-executable program code instructions comprising program code instructions to:
- control two or more user input elements comprising a user selectable part of a user input device;
- determine that an apparatus is in either a first state or a second state based on user input elements comprising the user selectable part wherein, in the first state the user selectable part is associated with a first function so that the first function is performed in response to actuation of the user selectable part, and where in the second state the user selectable part is associated with a second function, different from the first function, so that the second function is performed in response to the actuation of the user selectable part; and
- control the tactile quality of the user selectable part with respect to the rest of the user input device so that the user selectable part is provided with a first tactile quality when the apparatus is in the first state and a second tactile quality when the apparatus is in the second state, wherein the tactile qualities are configured so that a user can distinguish between the first tactile quality and the second tactile quality via a sense of touch, with the user selectable part is selectable to perform the first function with the first tactile quality in the first state and the user selectable part is selectable with the second tactile quality to perform the second function in the second state such that the user can distinguish between the user selectable part in the first state and the same user selectable part in the second state via a sense of touch.

20. A hand portable device comprising the apparatus as claimed in claim 1.

* * * * *

UNITED STATES PATENT AND TRADEMARK OFFICE
CERTIFICATE OF CORRECTION

PATENT NO. : 9,791,928 B2
APPLICATION NO. : 12/767349
DATED : October 17, 2017
INVENTOR(S) : Ashley Colley Page 1 of 1

It is certified that error appears in the above-identified patent and that said Letters Patent is hereby corrected as shown below:

In the Claims

Column 16,
Line 24, "where" should read --wherein--.
Line 37, "with the user" should read --wherein the user--.

Signed and Sealed this
Twelfth Day of June, 2018

Andrei Iancu
*Director of the United States Patent and Trademark Office*